United States Patent [19]
Hough

[11] 3,946,316
[45] Mar. 23, 1976

[54] RADIO-PILLOW DEVICE

[76] Inventor: William T. Hough, 312 S. Finley Ave., Basking Ridge, N.J. 07920

[22] Filed: Nov. 14, 1974

[21] Appl. No.: 523,908

[52] U.S. Cl. ................................................ 325/310
[51] Int. Cl.² ......................................... H04B 1/06
[58] Field of Search...... 325/310; 179/146 R, 146 H, 179/182 R, 1 R, 1 E, 1 GA; 5/337, 339; 340/279

[56] References Cited
UNITED STATES PATENTS

| 1,515,467 | 11/1924 | Draving | 179/146 H |
|---|---|---|---|
| 1,712,158 | 5/1929 | Neal | 325/310 |
| 2,000,523 | 5/1935 | Knapp | 179/146 H |
| 2,059,588 | 11/1936 | Kuhn | 179/146 H |
| 2,512,641 | 6/1950 | Halstead | 179/146 H |
| 2,958,769 | 11/1960 | Bounds | 325/310 |
| 3,290,450 | 12/1966 | Majoros | 179/146 H |
| R19,051 | 1/1934 | Nicolson | 325/310 X |

Primary Examiner—Robert L. Griffin
Assistant Examiner—Robert Hearn

[57] ABSTRACT

In a preferred embodiment, a pillow including a tubular flexible material having a space defined within the tube divided into a sealed central space portion having pillow stuffing therein, and adjacent the central sealed portion there being at opposite ends thereof open-ended space-defining portions respectively each invertible over and around the sealed central space portion and one over and around the other when both are in an inverted state, with one end portion having adjacent an end thereof nearest the sealed central space portion two apertures extending through the tubular flexible material and with the other end portion having adjacent an end thereof most distant from the sealed central space portion two apertures located to become aligned with the apertures of the other end portion when both are inverted around and over the sealed central space portion of the tubular flexible material, and a radio receiver and speaker combination of miniature size and of substantially flattened shape located between the outer face of the sealed central space and an inner face of a first-inverted one of said end portions with each of volume and tuning shafts extending through aligned ones respectively of the two apertures in the respective ones of the inverted end portions with detachable knobs locked on distal ends of the inserted volume and tuning shafts, the inner face of the tubular flexible material before inversion of the end portions thereof being an aesthetically finished face such that upon the inversion to the inverted state of the end portions the aesthetically finished face is outwardly directed for each of the end portion's tubular flexible material, locked in the inverted state by the volume and tuning shafts having knobs locked thereon.

11 Claims, 3 Drawing Figures

RADIO-PILLOW DEVICE

This invention relates to a pillow having a radio embodied therein.

BACKGROUND TO THE INVENTION

Prior to the present invention, there have existed numerous patents directed to the inclusion of a noise maker such as tinker toys and such as radio speakers and/or radio receiver and speaker within space within the body of the pillow or stuffing thereof. Accordingly, there is nothing new in the general concept of such a broad combination.

However, there are numerous other matters which are prohibitive of bringing such novelty devices with their practical utities of music during sleep or to induce sleep or to wake-up by, to the availability of the public which thus far has been largely denied such type devices.

OBJECTS OF THE INVENTION

Objects of the present invention include the obtaining of a novel combination of the type described above at a low cost of production as based upon a novel simplified structure simplifying the materials and labor of production such that low cost results to make the completed device available at attractive low purchase prices to the consumer.

Another object includes the obtaining of a novel pillow structure which substantially obviates the possibility of theft of contents such as a radio within the pillow when the pillow is in a salable state of completed assemblage.

Another object is to obtain a combination novel pillow and radio device which is designed to slow-down any attempt to gain entrance to pillow inner contents such as the radio.

Another object is to obtain a combination as noted for one or more of preceding objects, which has an aesthetic appearance in the assembled state devoid of a separate pillow case therefor.

Another object is to obtain one or more preceding objects together with the obtaining gaining the aesthetic appearance and security against theft while maintaining low cost of material and few necessary parts and a minimum of assemblage effort.

Other objects become apparent from the preceding and following disclosure.

One or more objects of the present invention are obtained by the invention defined herein.

BROAD DESCRIPTION OF THE INVENTION

Broadly the invention includes the preceding objects and the fulfillment thereof, one or more, by a pillow casing or pillow ticking material of a tubular flexible material in its nature, such as fabric and/or plastic or any other conventionally known or desirable material, which is divided along transverse lines across tubular space defined by the tubular material into three portions preferably, including a central totally sealed portion in which pillow stuffing is located, and at opposite ends the open-ended end portions open at ends thereof away from the centrally sealed cental portion, and there being a miniature radio receiver and speaker set enclosable adjacent an outer face of the central portion by inversion of the tubular flexible material of each end portion. In various preferred embodiments, the tubular flexible material has its inner face before any inverion of the end portions, facing inwardly as the aesthetically appearing face thereof, such that upon inversion of the end portions the aesthetically appearing face of each end portion is facing outwardly in the inverted state of thereby encompassing the central sealed portion, with the radio receiver and speaker(s) locked between the central portions outer face and the inner face — in the inverted state — of the first-inverted ones of the opposite invertible end portions, being locked into this inverted state for each end portion by shafts of the volume and tuning controls extending outwardly through through-apertures of the opposite inverted end portions with their respective through-apertures being located to be aligned with one-another for the overlapping inverted end portions. Preferably the apertures of one end portion are located at an end location of the respective one end portion at a site adjacent the sealed central portion such that it is convient for adjusting by the knobs mounted on the shafts in the inserted state and such that the radio receiver is distant from the inverted open end opening of that end portion, while the other overlying inverted end portion has the shaft-receiving apertures located adjacent its open end aligned with the apertures of the first-inverted end portion and receivable of the volume and tuning shafts thereby the entire outer last-inverted end portion enclosing the open end of the first-inverted end portion and locking the second-inverted outer inverted end portion in its inverted state in a security manner. It is further noted that not only is the outer pillow appearance aesthically attractive, but the pillow as viewed through the open end of the inverted out (last-inverted) end portion, is also aesthetically pleasing since nothing but finished surface is visible when both of the end portions are inverted, while concurrently the radio receiver and speaker(s) is(are) securely locked against the possible easy theft otherwise within the store. This all is accomplished by a simple stitching at two points transversely across a tubular inverted fabric such that a central pillow-stuffing compartment is obtained which has ends thereof that may be inverted around the radio receiver and speaker(s). The pillow-stuffing composition may be included before the stitching to form the three portions, or may be subsequently inserted by a foam-rubber insertion tube or by blowing or otherwise inserting stuffing through a small aperture. Although three sections are preferred, the same may be achieved to a lesser degree by having one end sealed and the other end open-ended and invertible.

THE FIGURES

DETAILED DESCRIPTION OF THE INVENTION

Figure 1:
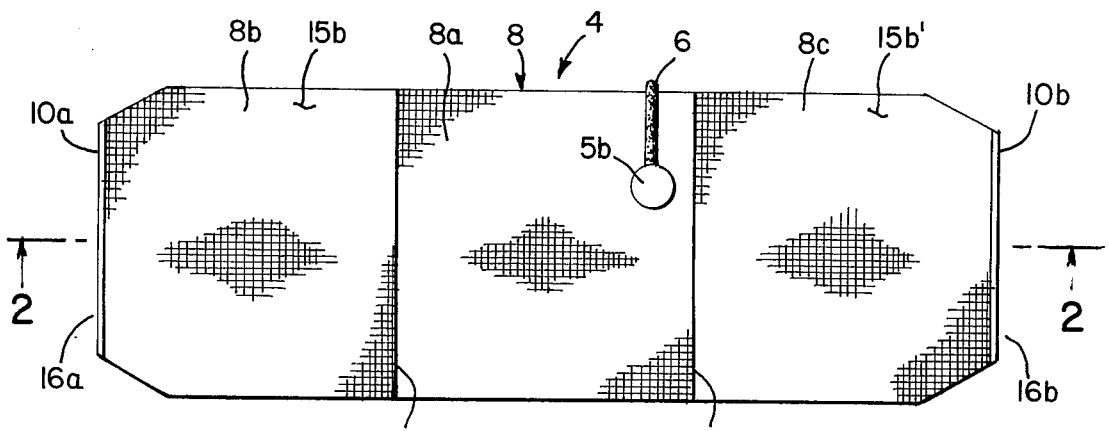
FIG. 1 illustrates an elevation plan view of the present invention in a state before inversion of the opposite end portions.
Figure 2:
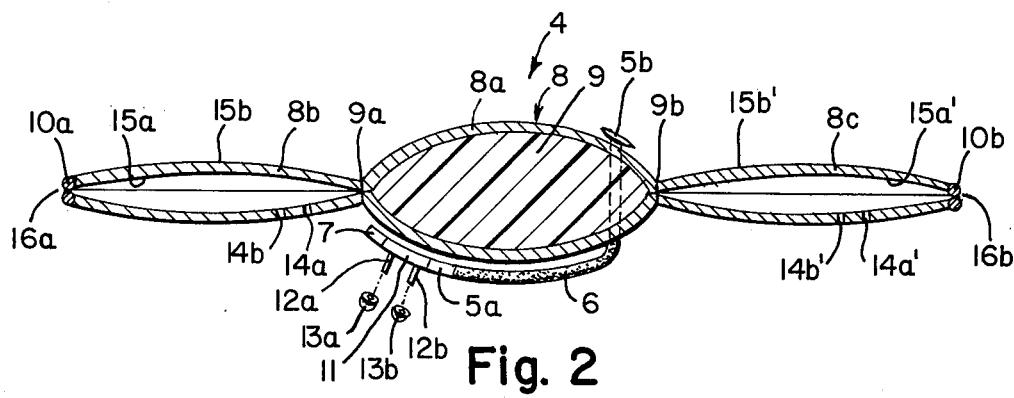
FIG. 2 illustrates a side cross-sectional view as taken along lines 2—2 of FIG. 1; knobs are shown in exploded view.
Figure 3:
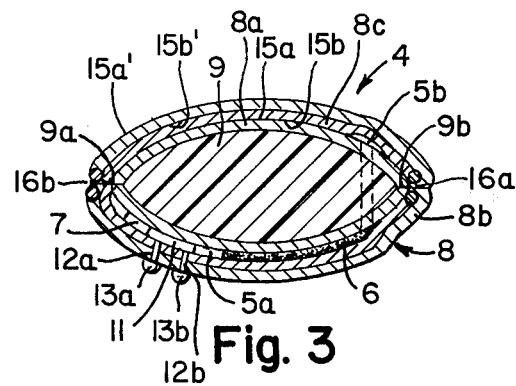
FIG. 3 illustrates a side cross-sectional view comparable to that of FIG. 2, except in a state of the opposite end portions being in the inverted and locked state.

In greater detail, all of FIGS. 1 through 3 disclose a common, same preferred embodiment of the invention earlier described above.

For purposes of this disclosure, the FIG. 1 view may be considered to be a top elevation plan view of the extended tubular flexible material 4 divided by typically sewn stitching 9a and 9b of FIG. 2, into an intermediate central portion sealed at each end thereof by the stitching extending transversely width-wise across the length of the tubular flexible material, with the upper face of a speaker (diagrammatically shown) facing upwardly as speaker 5 connected to speaker wiring 6 extending laterally around the edge toward and under the pillow tubular flexible material. In FIG. 1, the rough or unfinished faces 15b and 15b' of the end portions of the tubular flexible material are disclosed.

In FIG. 2, in side cross-sectional view through FIG. 1 embodiment along lines 2—2 thereof, the same details are shown for the same of the three sections, namely the central section portion 8a, and the two end portions 8b and 8c respectively defined by the stitchings 9a and 9b. The respective end portions 8b and 8c define openings 16a and 16b respectively, and preferably include an elastic band, one at each end, as bands 10a and 10b respectively which serve to provide for more perfect enclosing of the pillow and to add neatness and aesthetic appeal, when the end portions 8b and 8c respectively are inverted. This FIG. 2 also discloses for the first time, the inner aesthetically finished faces of the portions 8b and 8c respectively faces 15a and 15b; accordingly, when these end portions 8b and 8c are inverted to enclose and extend around the central portion 8a, as illustrated in FIG. 3, the FIG. 2 inwardly directed finished faces 15a and 15a' respectively of end portions 8b and 8c, become the outwardly directed finished faces as illustrated in the FIG. 3 completed embodiment. FIG. 2 also illustrates the typically extending connector cord 6 discussed above, connected to speaker 5a as a second and downwardly facing speaker — so that it is a matter of choice as to which face of the pillow shall be used as an upper surface of the completed pillow by a consumer customer, and with the both speakers being shown connected to the radio receiver adjoining, and the radio receiver 11 having an adjoining battery-contining compartment 7. The end portion 8b has the paired apertures 14a and 14b and the end portion 8c has the paired apertures 14a' and 14b' position respectively for overlapping the apertures 14a and 14 b when each of the portions 8b and 8c are inverted as shown in FIG. 3 with the volume shaft 12a and the turning shaft 12b extending though the respective apertures 14a–14a' and 14b–14b', with the removable knobs 13a and 13b respectively locked onto the distal ends of the respective shafts.

Although the access to the radio receiver and its battery compartment is simple, possible by mere removal of the knobs and inverting the portions to convert to the FIG. 1 opened state, such an operation is sufficiently time consuming and obvious as to render the likelihood of theft of radio unlikely. Also, it should be noted that the radio receiver, being concealed thereby requires no special casing, although a plastic back with or without padding, or padding along may be provided around the radio receiver parts. However, such cover and/or padding is not normally necessary because the pillow stuffing itself is yieldable to prevent the radio receiver and/or battery compartment and/or speaker(s) from projecting or protruding or from being uncomfortable to the head of a person resting thereon.

The invention includes obvious variations and equivalents.

I claim:

1. A radio-pillow device comprising in combination: a tubular flexible material divided into at least two segregated portions one from the other, with each portion defining therein a space, a first one of said portions having an open tubular end and at least a first aperture, and an adjacent second one of said portions having its respective defined space thereof substantially totally enclosed such that pillow stuffing is retainable therein, the second portion being closed at each of opposite ends of its space thereof, a portion of the tubular flexible material defining said first portion being invertible and thereby enclosable of and around said second portion; a radio means for receiving radio waves and converting the radio waves to sound waves, the radio means being of a predetermined miniature size and substantially flattened in shape such that it is positionable adjacent an outer surface of said second portion and within an enclosure of the first portion when said first portion is in an inverted state enclosing the second portion, said radio means including at least volume and tuning shaft elements extending outwardly for extending through said first aperture.

2. A radio-pillow device of claim 1, in which said first portion includes said first aperture located adjacent a closed end of said first portion.

3. A radio-pillow device of claim 2, in which said portions include a third portion having an open tubular end at one end thereof and having a closed end adjacent said second portion, said third portion defining space therein and being invertible and thereby enclosable of each of said second portion and of said first portion when in an inverted state.

4. A radio-pillow device of claim 3, in which said third portion includes at least a second aperture located adjacent an open end thereof of a size receivable therethrough at least on of said volume and tuning shafts.

5. A radio-pillow device of claim 4, in which said first portion and said third portion are each in inverted states and one thereof encloses said second portion, and in which one of the first portion and said third portion encloses the other of the first and third portions, with at least one of said volume and tuning shafts extending through said first aperture and said second aperture.

6. A radio-pillow device of claim 5, in which said radio means further includes a detachably lockable knob element for respective ones of said volume and tuning shafts, mounted on distal ends of the volume and tuning shafts when extending through the first and second apertures.

7. A radio-pillow device of claim 6, including each of third and fourth apertures defined in said tubular flexible material, said third aperture in said first portion and said fourth aperture in said third portion, with one of the volume and tuning shafts extending through the first and second apertures and the other of the volume and tuning shafts extending through the third and fourth apertures, respectively, adapted such that the first portion and the third portion each in the inverted state are each locked in the inverted state by the volume and tuning shafts having the respective knobs mounted on the distal ends thereof.

8. A radio-pillow device of claim 7, including pillow-stuffing composition within the space defined within the second portion.

9. A radio-pillow device of claim 8, in which said first portion and said third portion, before inversion, have an aesthetically finished face of said tubular flexible material on the inwardly facing surface of the first and third portions.

10. A radio-pillow device of claim 3, including pillow-stuffing composition within the space defined within the second portion, and in which said first portion and said third portion, before inversion, have an aesthetically finished face of said tubular flexible material on the inwardly facing surface of the first and third portions.

11. A radio-pillow device of claim 1, in which said first portion, before inversion, has an aesthetically finished face of said tubular flexible material on the inwardly facing surface of the first portion.

* * * * *